United States Patent [19]

Danno et al.

[11] 4,423,517
[45] Dec. 27, 1983

[54] CODE SEQUENCE SYNCHRONIZATION SYSTEM FOR SPREAD SPECTRUM COMMUNICATION RECEIVER

[75] Inventors: Tsuneo Danno, Moriguchi; Masashi Kanno, Katano; Eiichiro Murata, Yokohama, all of Japan

[73] Assignee: Matsushita Electric Industrial Co., Ltd., Osaka, Japan

[21] Appl. No.: 226,472

[22] Filed: Jan. 19, 1981

[30] Foreign Application Priority Data

Jan. 21, 1980 [JP] Japan ................................. 55-6212

[51] Int. Cl.³ ............................................. H04K 1/04
[52] U.S. Cl. ........................................ 375/1; 375/115; 370/107
[58] Field of Search ................... 375/1, 93, 115, 116, 375/118, 25; 370/107, 108; 343/5 PN, 100 CL

[56] References Cited

U.S. PATENT DOCUMENTS

| | | | |
|---|---|---|---|
| 3,404,231 | 10/1968 | Aaron et al. | 375/25 |
| 3,706,933 | 12/1972 | Bidell et al. | 375/1 |
| 3,878,527 | 4/1975 | Rensin et al. | 375/118 |
| 4,039,749 | 8/1977 | Gordy et al. | 375/1 |
| 4,112,368 | 9/1978 | Ewanus et al. | 375/1 |
| 4,221,005 | 9/1980 | La Flame | 375/115 |
| 4,351,064 | 9/1982 | Ewanus | 375/1 |

FOREIGN PATENT DOCUMENTS 7834266 3/1979 United Kingdom .................. 375/1

Primary Examiner—Benedict V. Safourek
Assistant Examiner—Stephen Chin
Attorney, Agent, or Firm—Wenderoth, Lind & Ponack

[57] ABSTRACT

A synchronization system for a spread spectrum communication receiver generates a receiving code sequence which is identical to an input code sequence and then varies the timing of the receiving code sequence using a correlator until the two code sequences are correlated.

2 Claims, 5 Drawing Figures

CODE SEQUENCE SYNCHRONIZATION SYSTEM FOR SPREAD SPECTRUM COMMUNICATION RECEIVER

BACKGROUND OF THE INVENTION

This invention relates to a receiver for a code division multiple access system, such as a spread spectrum communication system.

The spread spectrum communication system spreads its spectrum in a wide area by use of a spread code sequence having a frequency band width which is far wider than that of the base band signal which after information, such as voice signals to be transmitted have been supplied with proper modulation, such as PSK or FM modulation, so as to compose the base band signal. At the receiving side, the same code sequence as that noted above is generated to search for correlation with the received signal while incrementally moving the code sequence little by little. Next, upon the detection of a correlation (i.e.—the synchronization between the transmitting and receiving codes), the search operation comes to a halt and a code tracking circuit for maintaining the synchronous condition operates so as to enable the system to remain in the communicating condition. In this instance, if a large time lag exists between the detection of a correlation and the stopping of the search, during this period there is a possibility that the search will be advanced until a non-synchronous condition occurs. In order to solve the abovenoted problem, it has been proposed that the search speed be reduced in consideration of the abovenoted time lag; however, under such a condition, it takes much time for synchronizing long transmitting codes that it is impossible to effect a high speed synchronization.

SUMMARY OF THE INVENTION

This invention has been designed to solve the problem of the time lag before synchronization detection, as noted above, in such a manner that receiving code sequence, after synchronization detection, is placed in the past condition or the future condition to thereby hold the position of transmitting and receiving codes at the best point (the peak of auto-correlation).

BRIEF DESCRIPTION OF THE DRAWINGS

Next, this invention will be detailed in accordance with an embodiment as shown in the drawings, in which.

DESCRIPTION OF THE PREFERRED EMBODIMENT

Figure 1:
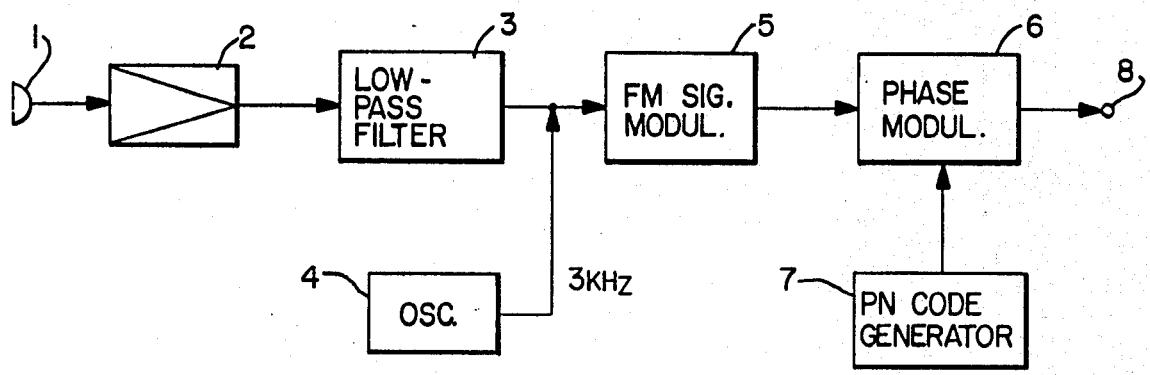
FIG. 1 is a block diagram of an exemplary transmitter for transmitting signal waves received by a receiver in accordance with the present invention.

FIG. 1 is a block diagram of an exemplary transmitter for transmitting signal waves received by a receiver in accordance with the present invention, in which element 1 is a microphone element, 2 is an amplifier element, 3 is a low-pass filter with a cut-off frequency of 2.7 KHz, element 4 is an oscillator having a pilot signal frequency of 3 KHz element, 5 is a FM signal modulator, element 6 is a phase modulator, element 7 is a pseudonoise code (to be hereinafter called PN code) generator, and element 8 is a transmitting output terminal.

Voice signals from microphone 1 and the pilot signal of 3 KHz FM-modulate a proper carrier wave, and the FM signal is 2-phase-modulated, i.e., spread-modulated, by the PN code to thereby compose transmission waves.

Figure 2:
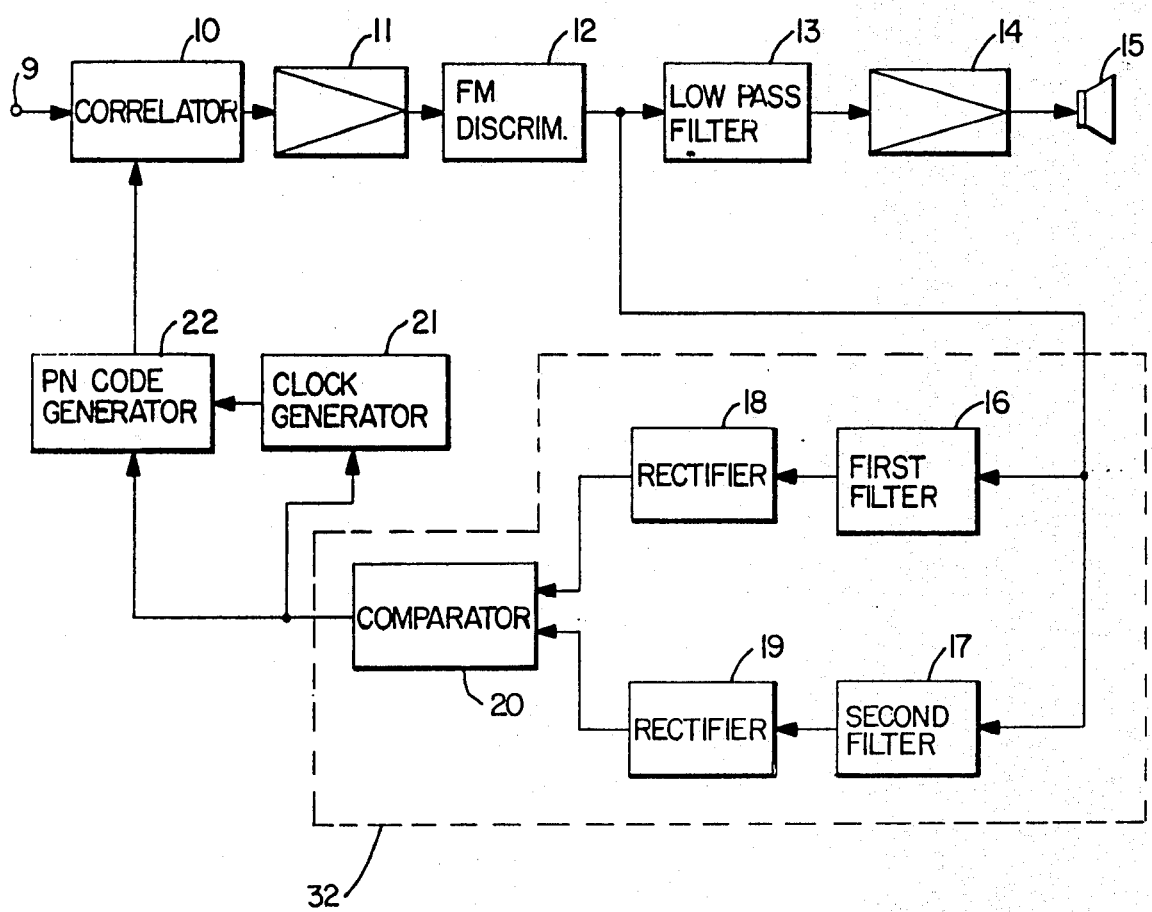
FIG. 2 is a block diagram of an embodiment of a receiver in accordance with the present invention.

FIG. 2 shows a block diagram of an embodiment of a receiver in accordance with the present invention suitable for receiving transmitted signal waves from the transmitter in FIG. 1, where for the convenience of description it is assumed that clock frequencies of the PN code of the transmitter and the receiver are quite identical. Actually, the two frequencies are not perfectly identical, whereby the code tracking circuit is required to maintain the synchronous condition after the synchronization detection.

Referring to FIG. 2, the received signal which is fed into input terminal 9 is detected by a correlator 10 for correlation with a PN signal from a PN code generator 22 which generates the same PN code as that of the transmitting side, the correlator 22 being an analog multiplier. If there is a correlation, at the output side of correlator 10 is obtained an FM signal corresponding to that output from the FM signal modulator 5 in FIG. 1, the FM signal being amplified by amplifier 11 and demodulated by a FM discriminator 12. A voice signal component is fed to a speaker by way of a low-pass filter 13 having a 2.7 KHz cut-off frequency and an amplifier 14.

On the other hand, a first filter 16, which is a high-pass filter having a 3.3 KHz cut-off frequency, extracts a noise component over 3.3 KHz, and a second filter 17, which is a band-pass filter having a 3 KHz central frequency extracts the pilot signal component, the noise component and pilot signal component being rectified into direct currents by rectifiers 18 and 19. These DC signals are compared by a comparator 20. The correlation detecting means 32 comprises elements 16 through 20, as shown in FIG. 2. The comparator 20, when pilot signal exists and the noise component having a frequency of 3.3 KHz or more is small, i.e., when the correlation is large enough, sends a correlation detecting singal to a clock generator 21 and PN code generator 22.

Figure 3:
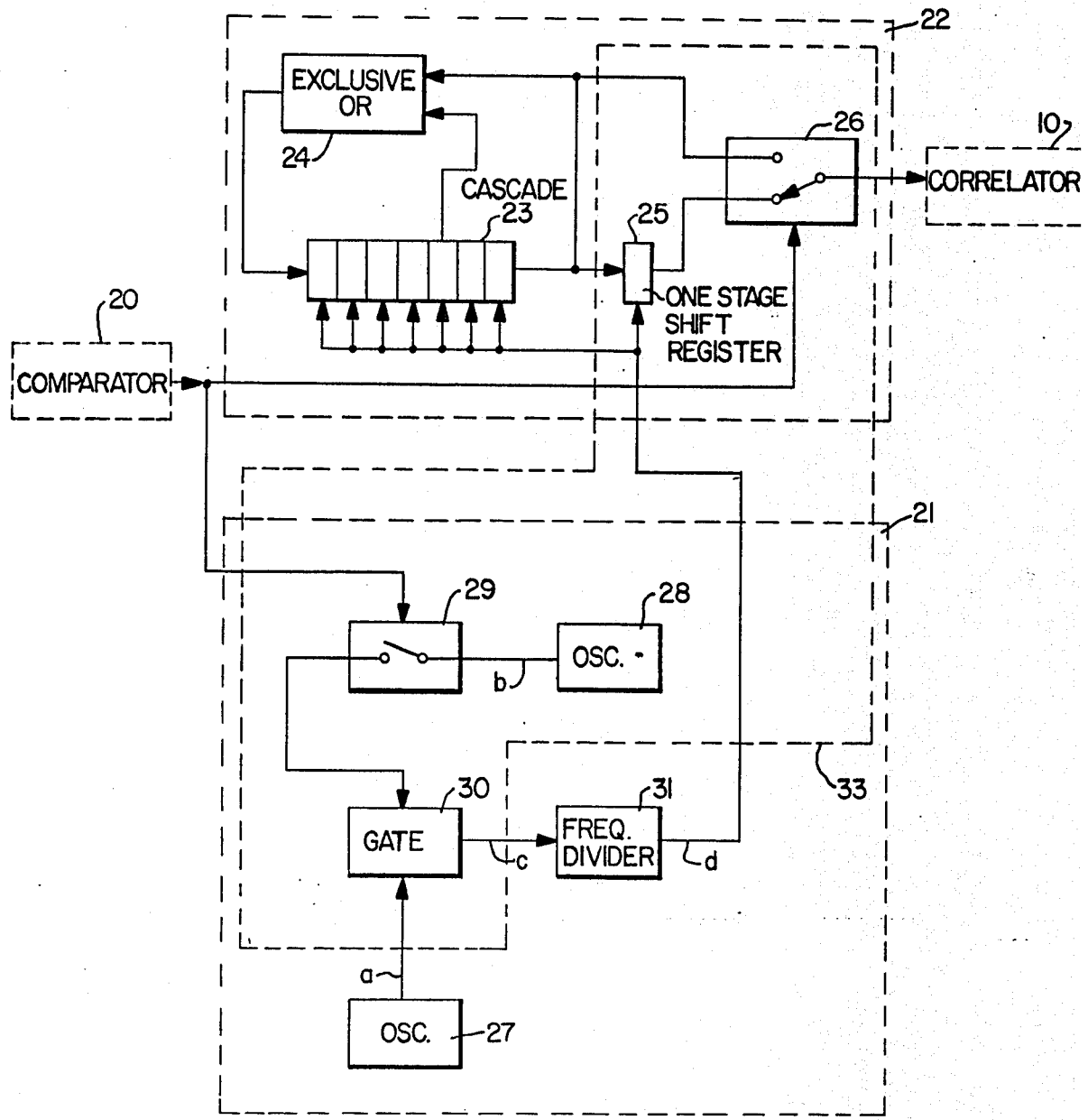
FIG. 3 is a block diagram of a principal portion of the FIG. 2 embodiment.

FIG. 3 is a block diagram of an exemplary composition of the PN code generator 22 and clock generator 21 shown in FIG. 2, in which element 23 is a cascade connected shift register element, 24 is an exclusive OR circuit used for feedback, wherein elements 23 and 24 compose the conventional PN code generator. Element 25 is a one stage shift register serving as a one bit memory for the PN code sequence. Element 26 is a changeover switch for determining whether or not the PN code which is passed through shift register 25 is to be supplied to correlator 10, the change-over being carried out by the correlation detection signal from a voltage comparator 20. Shift registers 23 and 25 are rightwardly shifted by a common clock signal from the clock generator 21. In the search condition, the PN code is supplied to correlator 10 through shift register 25, but, when the correlation detection signal is sent from voltage comparator 20, the PN code is not passed through the register 25. In other words, when the correlation is detected, the PN code sent to correlator 10 leads by one bit.

Element 27 is an oscillator of 5 MHz, element 28 is an oscillator of 2.5 KHz, element 29 is an intermittent switch for oscillator 28, element 30 is a gate circuit, and element 31 is a divide by five frequency divider; the intermittent switch 29 is controlled by correlation detection signal and is on in the search condition, and is off when the correlation detection signal exists.

Figure 4:
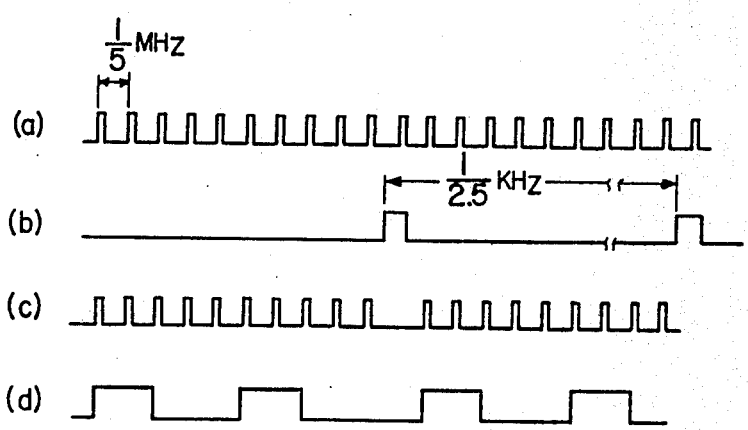
FIGS. 4-(a), -(b), -(c) and -(d), show the waveforms for elements shown in FIG. 3.

FIG. 4 shows the waveform present at elements 28–30 of clock generator 21 as shown in FIG. 3. FIG. 4-(a) shows an output waveform of oscillator 27, and FIG. 4-(b) shows an output waveform of oscillator 28. Gate circuit 30 cuts off the output of oscillator 27 at the timing of output of oscillator 28, i.e., every 400 $\mu$S, so that the output waveform of gate circuit 30 is formed as shown by FIG. 4-(c). Hence, frequency divider 31 has an output waveform as shown in FIG. 4-(d), so that, during the search condition, the clocks of shift registers 23 and 25 lag by one fifth every 400 $\mu$S, thereby performing the search operation.

Figure 5:
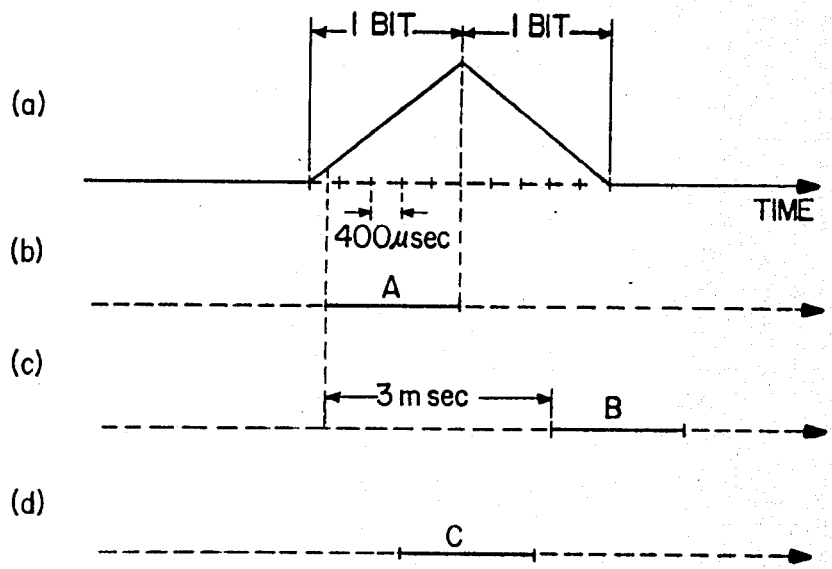
FIGS. 5-(a), -(b), -(c) and -(d) are views explanatory of the operation of the FIG. 2 embodiment.

FIG. 5 is a view explanator of the operation from the correlation detection to the movement of code bit.

The auto-correlation of the PN code, as is well-known, is formed between the peaks of $\pm 1$ bit as shown in FIG. 5-(a), which may be deemed an output level of the FM modulation signal from correlator 10. Now, it is assumed that the search operation every 400 $\mu$S allows the correlation output to appear from the left side in FIG. 5 and FM discriminator 12 in FIG. 2 generates a detection output at least in a range A as shown in FIG. 5-(b).

Next, it is assumed that the correlation detection signal is obtained after 3 mS, i.e., in a range B as shown in FIG. 5-(c), due to time lags in the high-pass filter 16, the bandpass filter 17 and rectifiers 18 and 19. Since the gate circuit 30 in FIG. 3 is kept closed until the correlation detection signal is obtained, the search is continued and the relative position between transmitting and receiving advances just into the range B shown in FIG. 5. Consequently, only a stopping of search at this moment will create a possibility of causing the receiving system to deviate from the synchronous condition. Hence, the embodiment of the invention, as shown in FIG. 3, actuates the changeover switch 26 by means of the correlation detection signal to move the PN code at the receiving side by one bit to return to the range C as shown in FIG. 5-(d), thereby being stopped in the vicinity of the center of correlation. This restoring means 33 comprises elements 25, 26 and 28 through 30 as shown in FIG. 3.

As seen from the above, this invention, even when a time lag is in the correlation detection, can stop receiving code at the best correlative position by moving the PN code. Hence, there is no need to reduce the search speed in order to compensate for the time lag, thereby enabling a high speed synchronization.

In addition, in the description of the embodiment of the invention, the movement of only one bit is carried out, but it is of course enough to properly adjust an amount of movement corresponding to the time lag of the synchronization detection. It is also apparent that the adjustment of the time lag of the synchronization detection can facilitate the restriction of overs and shorts of the movement to the best point of correlation.

What is claimed is:

1. A spread spectrum receiver for receiving a spread spectrum signal, comprising:
    a correlating means for correlating a pseudonoise code with a received signal spectrum signal so as to collapse the spread spectrum of the received signal;
    a demodulating means coupled to said correlating means for demodulating the thus collapsed received signal;
    a detecting means coupled to said demodulating means for detecting synchronization between said pseudonoise code and said demodulated collapsed received signal;
    a clock pulse generating means coupled to said detecting means for generating a clock pulse which is the same as that of said received signal when said pseudonoise code and said demodulated received signal are synchronized with each other, and which has a clock rate which has a small offset from that of said demodulated received signal so as to search the synchronization when said pseudonoise code and said demodulated received signal are out of synchronization with each other; and
    a pseudonoise code generating means coupled to said detecting means and also coupled to and driven by said clock pulse generating means for generating said pseudonoise code so as to restore the relative position between said pseudonoise code and a pseudonoise code of said demodulated received signal at least before a time that the synchronization has been detected by said detecting means;
    wherein said detecting means comprises: a first filter for extracting a noise component from the output of said demodulating means in order to ensure the detecting of said synchronization;
    and wherein said detecting means further comprises: a second filter for extracting a pilot signal component from the output of said demodulating means, and a comparator for comparing said noise component with said pilot signal component in order to ensure the detecting of said synchronization.

2. A spread spectrum receiver according to claim 1, wherein said demodulating means comprises an FM discriminator for obtaining a base band signal.

* * * * *